(12) United States Patent
Babin et al.

(10) Patent No.: US 7,803,306 B2
(45) Date of Patent: Sep. 28, 2010

(54) INDIVIDUAL CAVITY SHUT-OFF VALVE FOR AN INJECTION MOLDING APPARATUS

(75) Inventors: Denis Babin, Georgetown (CA); Valery Ten, Burlington (CA); Fabrice Fairy, Barbizon (FR)

(73) Assignee: Mold-Masters (2007) Limited, Georgetown (CA)

( * ) Notice: Subject to any disclaimer, the term of this patent is extended or adjusted under 35 U.S.C. 154(b) by 146 days.

(21) Appl. No.: 12/245,956

(22) Filed: Oct. 6, 2008

(65) Prior Publication Data

US 2009/0051080 A1 Feb. 26, 2009

Related U.S. Application Data

(63) Continuation-in-part of application No. 11/764,163, filed on Jun. 15, 2007, now Pat. No. 7,547,208.

(60) Provisional application No. 60/814,388, filed on Jun. 16, 2006.

(51) Int. Cl.
*B29C 45/23* (2006.01)
(52) U.S. Cl. .................. 264/328.9; 425/564; 425/572
(58) Field of Classification Search ............... 425/562, 425/563, 564, 565, 566, 572; 264/328.9
See application file for complete search history.

(56) References Cited

U.S. PATENT DOCUMENTS

| 3,371,384 | A | * | 3/1968 | Nouel | .................. | 425/564 |
| 6,146,123 | A | | 11/2000 | Lausenhammer et al. | | |
| 6,245,279 | B1 | | 6/2001 | Kalemba | | |
| 7,322,817 | B2 | | 1/2008 | Manner | | |
| 7,658,606 | B2 | * | 2/2010 | Klobucar et al. | ............ | 425/564 |
| 2004/0009259 | A1 | | 1/2004 | Manner | | |
| 2006/0233911 | A1 | | 10/2006 | Spuller | | |
| 2006/0257521 | A1 | | 11/2006 | Spuller | | |

FOREIGN PATENT DOCUMENTS

| DE | 4234326 | 4/1994 |
| DE | 197 42 099 A1 | 4/1998 |
| DE | 20 2008 005 073 U1 | 8/2008 |
| EP | 0 447 573 A1 | 9/1991 |
| JP | 54-072262 | 6/1979 |
| JP | 54-076656 | 6/1979 |
| JP | 54-076657 | 6/1979 |
| JP | 7068601 | 3/1995 |

* cited by examiner

*Primary Examiner*—Tim Heitbrink
(74) *Attorney, Agent, or Firm*—Medler Ferro PLLC

(57) ABSTRACT

An injection molding apparatus includes a first nozzle having a first nozzle melt channel in fluid communication with a manifold melt channel, and a second nozzle having a second nozzle melt channel in fluid communication with the first nozzle melt channel. A nozzle link is provided between the first nozzle and the second nozzle and includes a nozzle link melt passage for fluidly coupling the first nozzle melt channel and the second nozzle melt channel. The second nozzle includes a plurality of outwardly extending melt passages in fluid communication with the second nozzle melt channel. The outwardly extending melt passages deliver melt to a plurality of mold cavities through a plurality of respective gate seals and mold gates. At least one shut-off valve is disposed within the second nozzle. The shut-off valve is associated with an outwardly extending melt passage and switchable between an open position and a closed position.

22 Claims, 13 Drawing Sheets

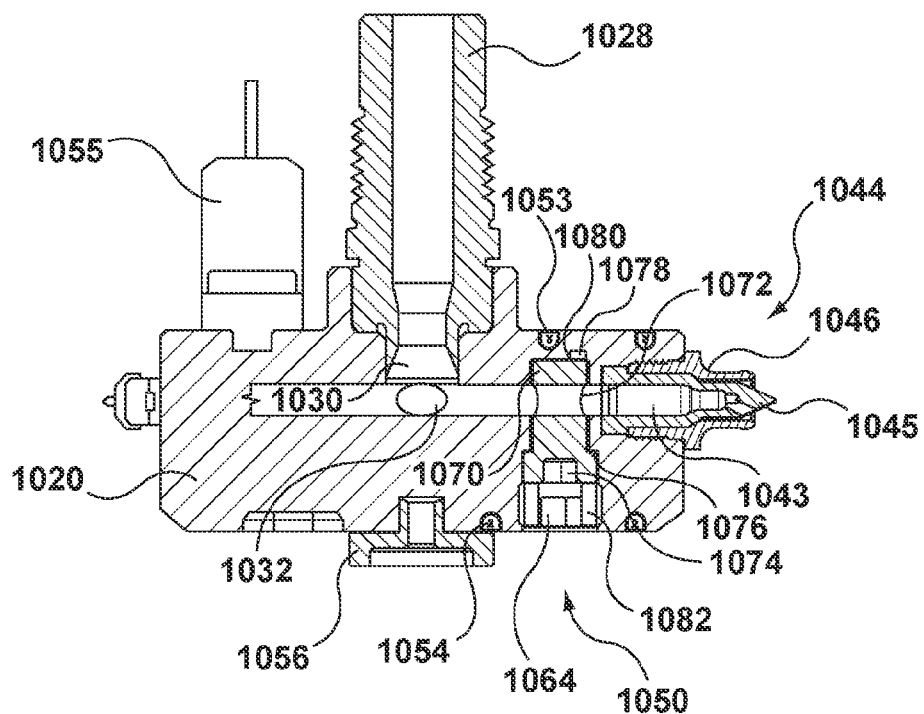
FIG. 10A
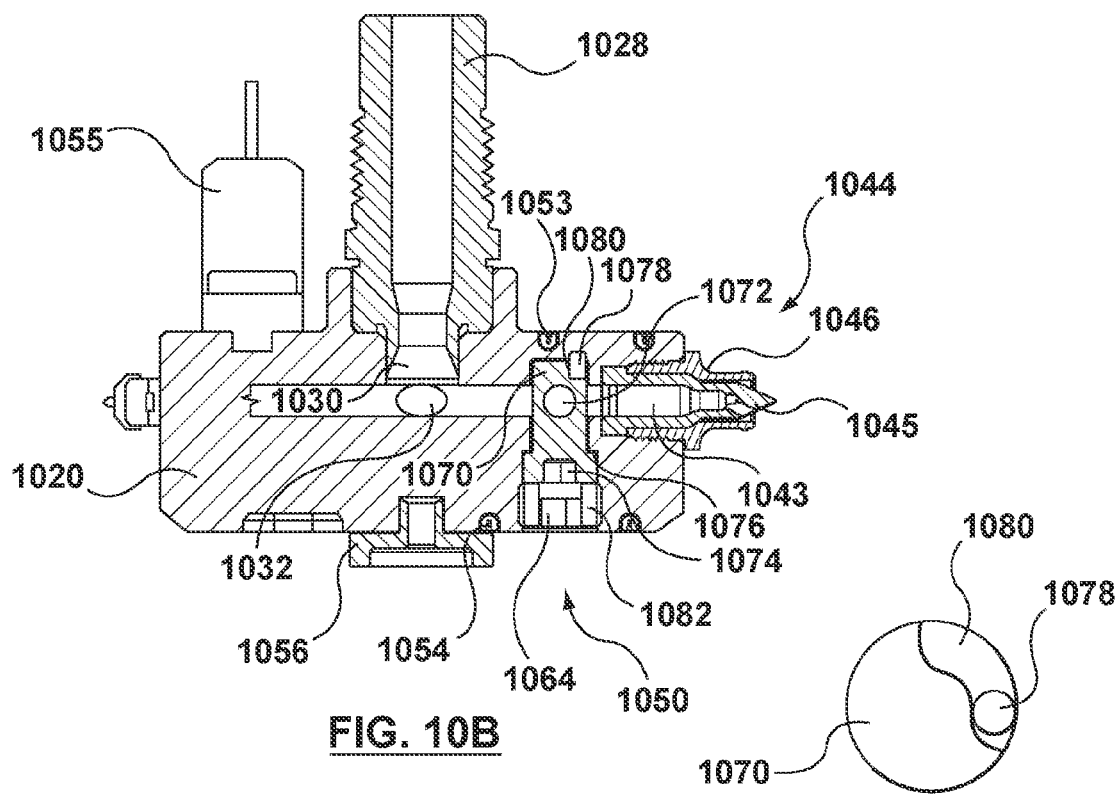
FIG. 10B
FIG. 10C

INDIVIDUAL CAVITY SHUT-OFF VALVE FOR AN INJECTION MOLDING APPARATUS

CROSS-REFERENCE TO RELATED APPLICATION

This application is a continuation-in-part of U.S. application Ser. No. 11/764,163 filed Jun. 15, 2007, now U.S. Pat. No. 7,547,208, which claims the benefit of U.S. provisional patent application No. 60/814,388 filed Jun. 16, 2006, both of which are hereby incorporated by reference in their entirety herein.

BACKGROUND OF THE INVENTION

1. Field of the Invention

The present invention relates generally to an injection molding apparatus and, in particular, to an individual shut-off valve for a multi-tip edge-gated injection molding apparatus.

2. Related Art

Edge gating from a nozzle of an injection molding apparatus through a number of edge gate tips is well known. A multi-cavity edge, or side, gated injection molding apparatus is described in U.S. Pat. No. 5,494,433 to Gellert, issued Feb. 27, 1996, which is incorporated in its entirety herein by reference thereto. Generally, the multi-cavity edge-gated injection molding apparatus includes several nozzles that are coupled to a manifold to receive a melt stream of moldable material therefrom. Each nozzle is mounted in a cylindrical opening in a mold to convey pressurized melt through a nozzle melt channel to mold gates, which lead to mold cavities in the mold. The mold cavities are spaced radially around the nozzle. Each mold gate extends through a gate insert, which is held in position by a gate insert retainer plate. Each mold gate is aligned with a gate seal that is threadably coupled to the nozzle. As such, the location of the gate seals is generally fixed relative to the mold.

A multi-cavity edge gated injection molding apparatus with a first nozzle, a nozzle link, and a second nozzle is described in U.S. Published Application Publication No. 2005-0196486 A1, published Sep. 8, 2005, which is incorporated in its entirety herein by reference thereto.

In such multi-cavity applications, a plethora of cavities are used during production, for example, a mold may have 192 mold cavities. A mold cavity, cavity insert, nozzle tip, gate seal, or other portion of the apparatus relating to a particular mold cavity may become damaged or otherwise not function properly. In such a situation with a conventional multi-cavity injection molding apparatus, an operator must shut down the entire mold while disassembling, repairing, and reassembling the damaged or malfunctioning area. Stopping an entire production for a problem relating to one mold cavity is inefficient.

SUMMARY OF THE INVENTION

According to one aspect of the present invention a plurality of shut-off valves are disposed within an edge-gated nozzle of an injection molding apparatus and associated with outwardly extending melt passages for delivering melt to a plurality of mold cavities through respective mold gates. The shut-off valves are each independently switchable between an open position and a closed position to allow or block flow of molding material through the respective outwardly extending melt passage.

BRIEF DESCRIPTION OF THE FIGURES

Embodiments of the present invention will now be described more fully with reference to the accompanying drawings where like reference numbers indicate similar structure.

FIGS. 10A-C are partial cross-sectional views and a schematic view of individually rotatable shut-off plugs for a second nozzle according to another embodiment of the present invention.

DETAILED DESCRIPTION OF THE INVENTION

Figure 1:
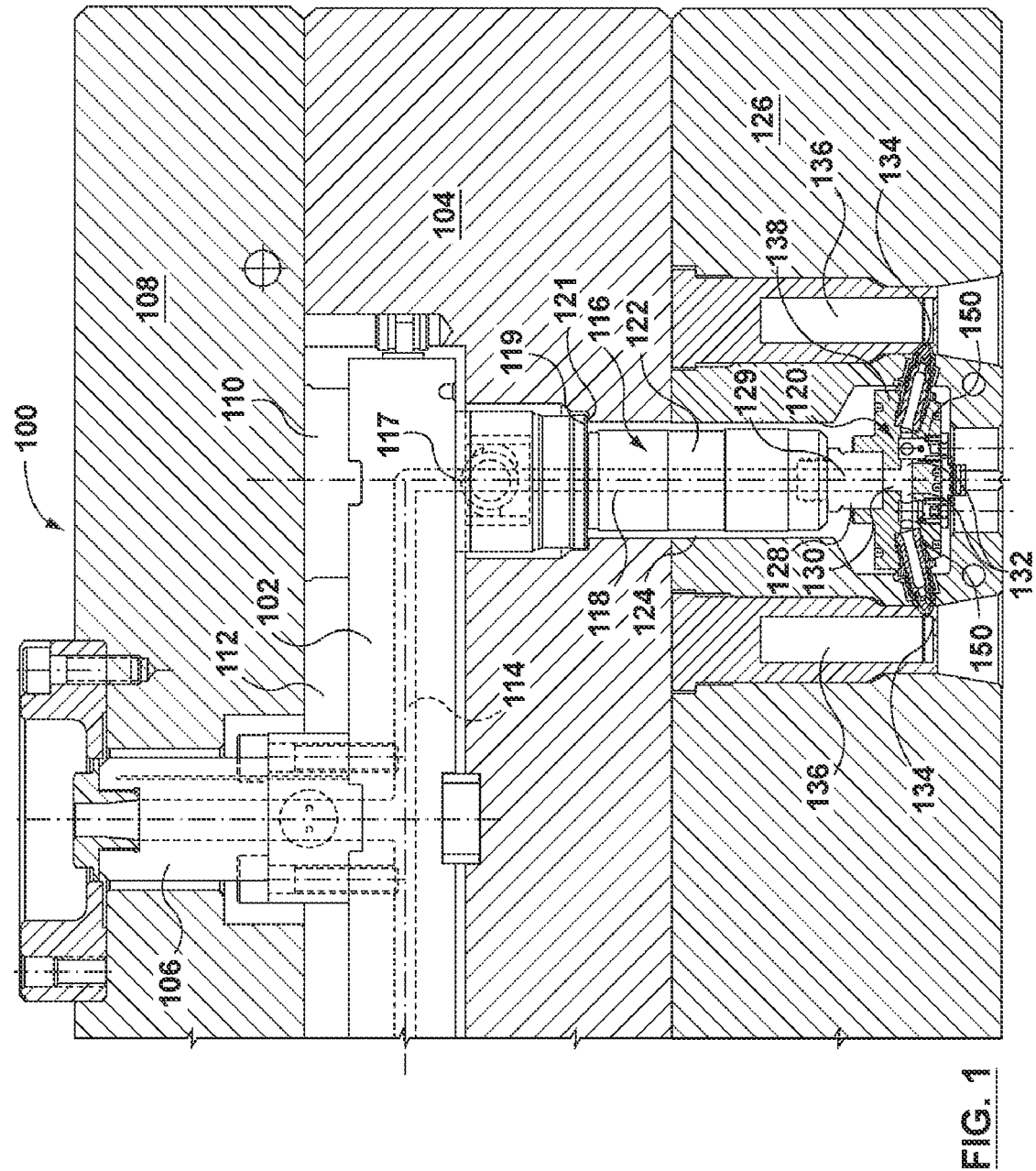
FIG. 1 is a partial cross-sectional view of a portion of an injection molding apparatus according to an embodiment of the present invention.
Figure 2:
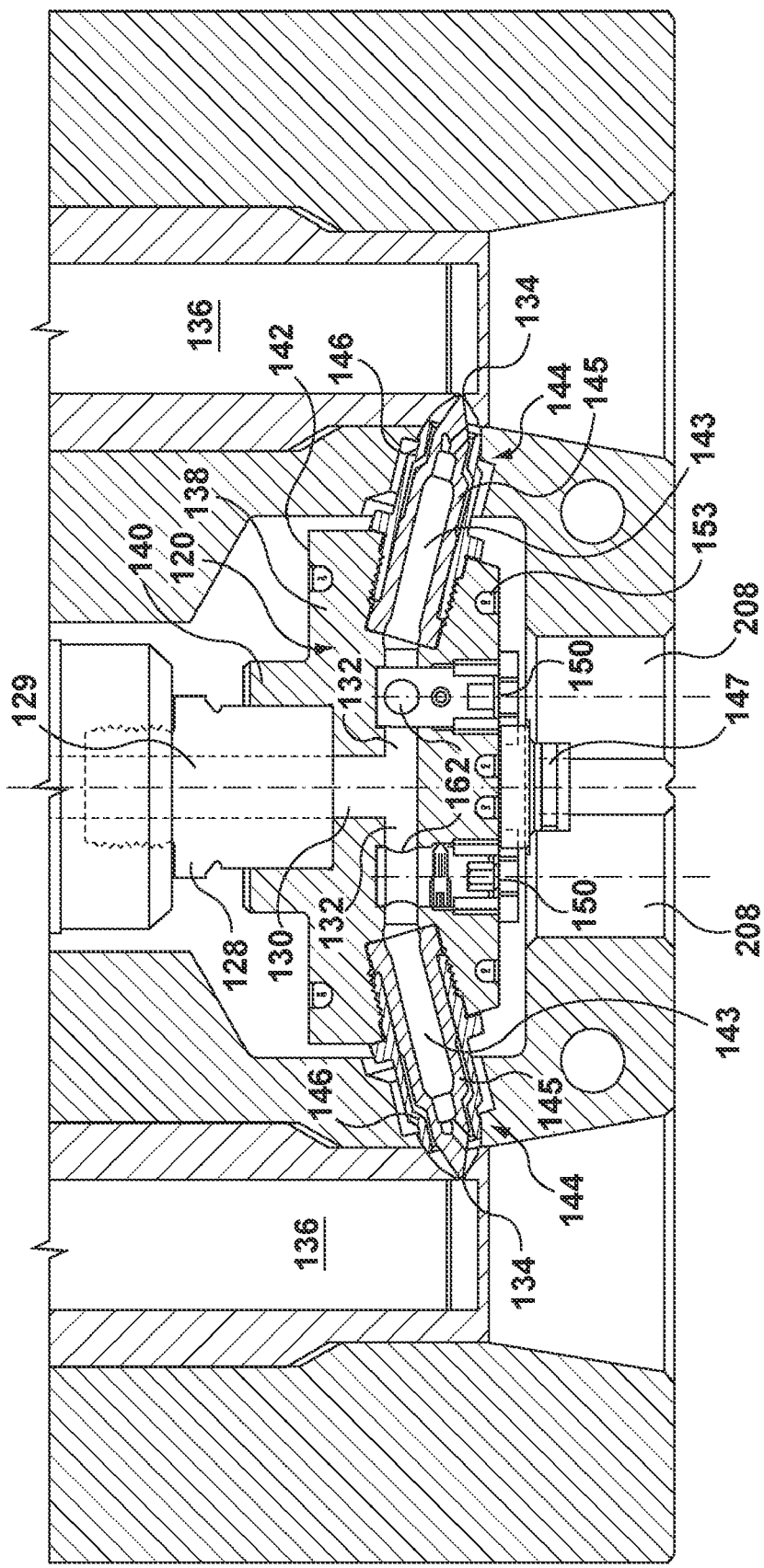
FIG. 2 is an enlarged view of a portion of FIG. 1.

A partial sectional view of an edge-gated injection molding apparatus in accordance with the present invention is illustrated in FIG. 1 and is generally indicated by reference numeral 100. FIG. 2 shows an enlarged view of a portion of the injection molding apparatus of FIG. 1. Injection molding apparatus 100 includes a manifold 102 that is located between a mold plate 104, a sprue bushing 106 and a back plate 108. A disk 110 restricts movement of the manifold 102 relative to the mold plate 104 and back plate 108 to axially fix the position of manifold 102. As such during operation, the manifold is effectively prevented from flexing in a direction of the back plate due to thermal expansion. An air space 112 is provided between the manifold 102 and the back plate 108. A machine nozzle (not shown) delivers a melt stream of molten material under pressure to a manifold channel 114 of the manifold 102 through sprue bushing 106. The disk 110 also helps to focus the force from manifold 102 directly over a first nozzle 116 to aid in sealing manifold 102 to first nozzle 116. Disk 110 maintains insulating air gap 112 between manifold 102 and back plate 108. Generally this disk is designed to provide minimum contact between manifold 102 and back plate 108 and is capable of flexing to absorb some of the forces therebetween.

A plurality of first, rear-mounted nozzles 116 are coupled to the manifold 102 (only one is shown in FIG. 1 for simplicity). Each first nozzle 116 includes a first nozzle melt channel 118 that is aligned with a respective manifold outlet 117 to receive the melt stream from the manifold channel 114. Each first nozzle 116 has a flange portion 119 that sits in a corresponding shoulder portion 121 of mold plate 104. The flange 119 being held in the corresponding shoulder 121 of the mold plate 104 acts to limit axial movement of the rear-mounted first nozzle 116 in the direction of a second nozzle 120, described below. During operation, the nozzle flange and mold plate shoulder arrangement supports the load from manifold 102 while still allowing the load from manifold 102 to be used as a sealing means/force between first nozzle 116 and manifold 102.

A nozzle body portion 122 of first nozzle 116 extends through an opening 124, which extends through mold plate 104 and a cavity plate 126. Nozzle heaters (not shown) are coupled about nozzle body 122 of each first nozzle 116 to provide heat thereto. The nozzle heaters are in communication with a power source (not shown) through an electrical connector (not shown). A thermocouple (not shown) is coupled to first nozzle 116 to provide temperature measurements thereof.

Second nozzle 120 is shown coupled to first nozzle 116 by a nozzle link 128. Second nozzle 120 is an edge-gating nozzle that includes a second nozzle melt channel 130, which is aligned with the first nozzle melt channel 118 of first nozzle 116 for receiving melt therefrom. Radially extending melt passages 132 branch out from second nozzle melt channel 130 to deliver melt through mold gates 134 to a series of mold cavities 136. Mold cavities 136 are radially spaced around nozzle tips/gate seals 144 coupled to second nozzle 120. Second nozzle 120 has a substantially brick-shaped nozzle body 138 as shown in FIGS. 10, 11, and 14 of U.S. Published Patent Application Publication No. 2005-0196486 A1. However, nozzle body 138 of second nozzle 120 can also be the substantially puck-shaped design shown in FIGS. 7-9 of U.S. Published Patent Application Publication No. 2005-0196486 A1 and described below with respect to FIGS. 7 and 8. A circular flange portion 140 extends from a back surface 142 of nozzle body 138 and is coupled to nozzle link 128. A projection 147 extends from a front surface 148 of nozzle body 138 to locate second nozzle 120 relative to mold cavity plate 126 to align gate seals 144 with mold gates 134, and to reduce lateral and longitudinal movement of second nozzle 120. As illustrated in FIG. 2, each second nozzle 120 includes a heater 153 and a respective thermocouple (not shown) for heating the melt therein. The nozzle heater 153 is in communication with a power source (not shown) through and electrical connectors (not shown). In the present embodiment as shown in FIGS. 1 and 2, heater 153 wraps around front surface 148 to back surface 142 of second nozzle 120 to beneficially surround gate seals 144 with heat.

Gate seals 144 threadably engage second nozzle 120 and include melt passages 143 to deliver melt from melt passages 132 to mold cavities 136 via mold gates 134. Each gate seal 144 is longitudinally fixed in position relative to each respective mold gate 134 and mold cavity 136. Gate seals 144 shown in FIGS. 1 and 2 are of a two part construction including a tip 145 that is surrounded by a seal 146. The gate seal 144 may be bi-metallic, for example, the seal 146 may be comprised of H13 steel and the tip 145 may be comprised of carbide or beryllium copper. The seal 146 and tip 145 are not limited to being metallic and therefore, the gate seal 144 may be comprised of any suitable material combination. The seal 146 and the tip 145 may alternatively be comprised of the same material. Alternatively, gate seal 144 can be a one-piece arrangement as shown and described with respect to the embodiment of FIG. 5 of U.S. Published Patent Application Publication No. 2005-0196486 A1.

Further details regarding first nozzle 116, second nozzle 120, and nozzle link 128 are provided in U.S. Published Patent Application Publication No. 2005-0196486 A1. As noted therein, in operation, edge-gated injection molding apparatus 100 is heated to an operating temperature, which causes the components including the manifold 102 and first and second nozzles 116, 120 to expand. Manifold 102 is relatively fixed in position on one surface by the interaction between disk 110 and back plate 108 and on the other surface by first nozzle 116, more particularly by the interaction between flange 119 of first nozzle 116 and shoulder 121 of mold plate 104. Gate seals 144 of an edge-gated tip portion of second nozzle 120 are also relatively fixed in position with respect to mold gates 134. As such, the thermal expansion of the system is accommodated by the interaction of nozzle link 128 with first and second nozzles 116, 120.

A melt stream of molten material is delivered under pressure from a machine nozzle (not shown) to manifold channel 114 of manifold 102. The melt is distributed from manifold channel 114 to nozzle melt channels 118 of a plurality of first nozzles 116. The melt flows from the nozzle melt channels 118, through melt passages 129 of nozzle links 128 and into the second nozzle melt channels 130. The melt then flows through melt passages 132, through gate seals 144, past gates 134 and into a respective mold cavity 136. Once the injection portion of the cycle is complete, the molded parts are cooled and ejected from the mold cavities.

If a mold cavity, gate seal, or other portion of the injection molding apparatus related to a particular mold cavity becomes damaged or otherwise nonoperational, flow to that cavity can be shut off by a shut-off valve 150 of the present invention. Shut-off valves 150 are disposed within a bore 152 in second nozzle 120 and intersect with melt passages 132.

Figure 3:
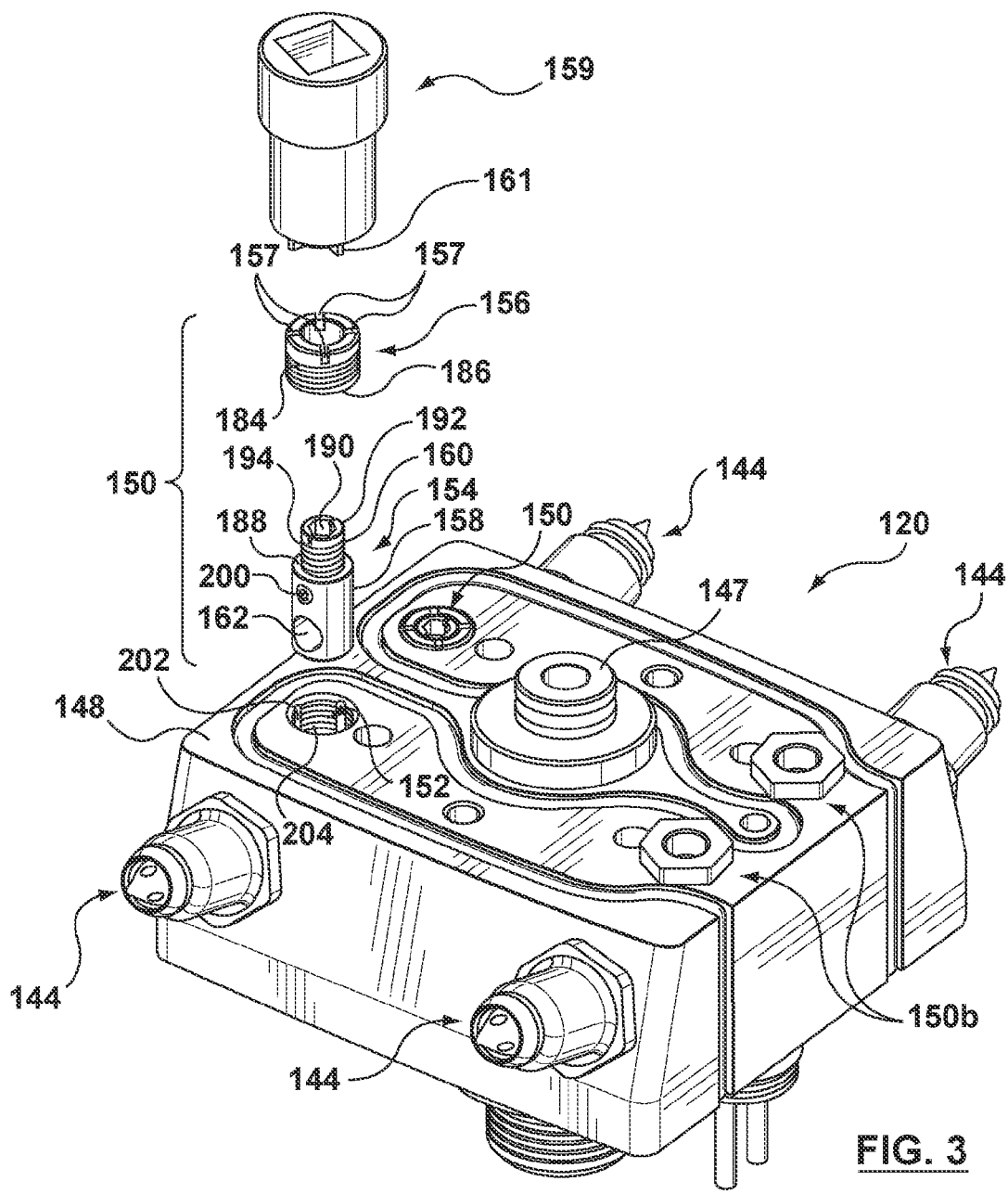
FIG. 3 is a bottom perspective view of the second nozzle of FIG. 1.

Shut-off valves 150 will be described in detail as shown in FIGS. 2-6. FIG. 3 is a perspective from a front (i.e., facing away from manifold 102) surface 148 of second nozzle 120. As can be seen, second nozzle 120 in FIG. 3 feeds four (4) cavities 136 through gate seals 144. Associated with each melt passage 132 leading to a gate seal 144 is a shut-off valve 150. In one embodiment, shut-off valve 150 includes a plug 154 and a cap 156. Plug 154 includes a first portion 158 and a second portion 160. First portion 158 has a larger diameter than second portion 160. First portion 158 fits snugly within bore 152. First portion 158 of plug 154 includes a passage 162 generally perpendicular to the longitudinal axis of plug 154 and extending through first portion 158. As shown in FIG. 2, passage 162 aligns with melt passage 132 to allow melt to flow therethrough and into cavity 136 through mold gate 134, as shown in left shut-off valve 150 of FIG. 2. By turning plug 154 so that passage 162 is perpendicular to melt passage 132, as shown in right shut-off valve 150 of FIG. 2, melt cannot pass through shut-off valve 150 and therefore does not flow into cavity 136. Such an arrangement permits an operator to shut-off flow to certain cavities without disrupting an entire system.

FIG. 3 shows two ways to retain plug 154 within second nozzle 120 for convenience of illustration. In practice, generally a single means to retain plugs 154 would be used. Shut-off valves 150 shown on the left side of FIG. 3 use a cap 156 that includes slots 157 in a front surface thereof. Cap 156 is a hollow cylinder and is threaded on an outside surface 184 thereof. Threaded outside surface 184 of cap 156 engages with threaded bore 152 in front surface 148 of second nozzle 120. A tool 159 including projections 161 engages cap 156 to tighten or loosen cap 156 within threaded bore 152. When tightening cap 156, a back surface 186 of cap 156 abuts a shoulder 188 of plug 154 to retain plug 154 within bore 152. In order to switch shut-off valve 150 from an open position to a closed position, or vice versa, tool 159 is used to loosen cap 156. Then a tool such as an Allen wrench is inserted into a shaped recess 190 in front surface 192 of plug 154 to turn plug 154 such that passage 162 is moved from a position where passage 162 is substantially aligned with melt passage 32 (an open position) to a position wherein passage 162 is aligned substantially perpendicular to melt passage 32 (a closed position). Cap 156 is then tightened to secure plug 154 in bore 152. Cap 156, when tightened, is flush with front surface 148 of second nozzle 120, thereby not requiring any additional space.

Second portion 160 of plug 154 further includes a threaded outer surface 194. Threaded outer surface 194 is used to be engaged by a threaded inner surface of a tool (not shown) to achieve a secure hold on plug 154 in order to remove plug 154 from bore 152 of second nozzle 120, for example, if plug 154 is damaged, clogged, worn, or for any other reason. Alternatively, outer surface of plug 154 may have shaped recesses to be engaged by a tool for removal from second nozzle 120.

Shut-off valve 150 may further include a position-indicating button 200 located on an outside surface of first portion 158 of plug 154. Button 200 is spring assisted such that is biased outward. Bore 152 in second nozzle 120 includes vertical grooves 202 located 90 degrees apart from each other. Two grooves 202 are shown in FIG. 3, however, four grooves 202 may be used. When plug 154 is being rotated within bore 152, button 200 is pressed against inner wall 204 of bore 152. When plug 154 reaches a position such that button 200 is aligned within one of the grooves 202, the spring bias of button 200 causes it to click forward into groove 202, thereby indicating that plug 154 is in the open or closed position. The spring bias of button 200 is light such that it can be easily overcome to move button 200 out of groove 202 to move plug from an open to a closed position, or vice versa. Witness/graduation marks, etc could also be used to locate the position of the plug.

Figure 3A:
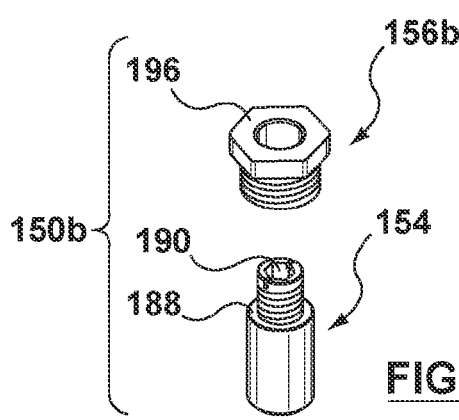
FIG. 3A is a perspective view of an alternative shut-off valve.

FIG. 3A shows an alternative embodiment of shut-off valve 150b. Shut-off valve 150b includes a plug 154 that is identical to plug 154 of shut-off valve 150. Shut-off valve further includes a cap 156b. Cap 156b is similar to cap 156 of shut-off valve 150, however, it does not require a special tool to remove it. Instead, cap 156b includes a nut-shaped head 196 that can be engaged with a conventional socket. Cap 156b is a hollow cylinder such that when it is tightened within threaded bore 152 such that shoulder 188 of plug 154 rests against it, recess 190 of plug 154 can be accessed. In all other aspects, shut-off valve 150b is identical to shut-off valve 150.

Figure 4:
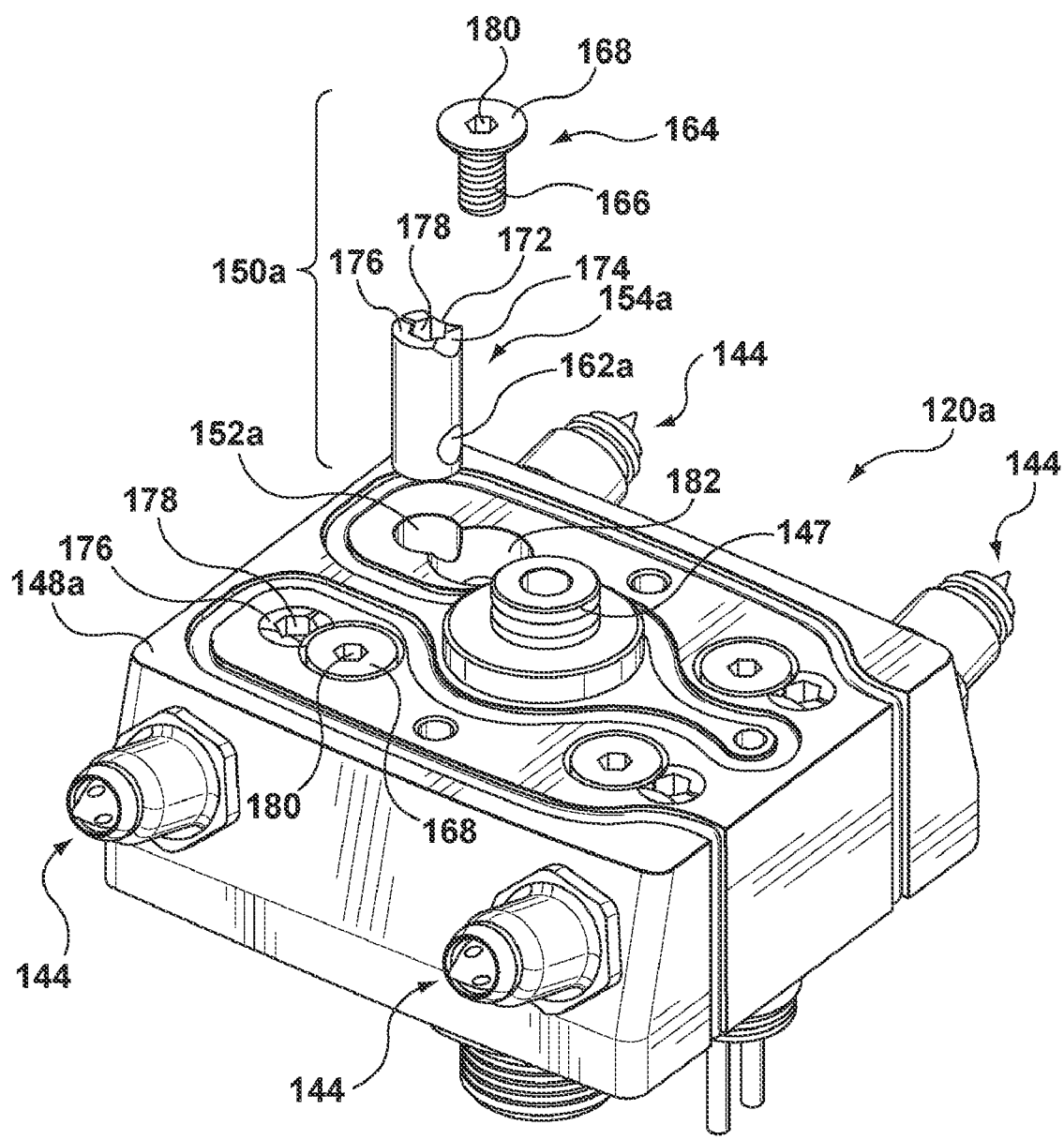
FIG. 4 is a bottom perspective view of a second nozzle showing an alternative shut-off valve.

FIG. 4 shows another embodiment of a shut-off valve 150a similar to FIG. 3. FIG. 4 is a perspective view showing the front surface 148a of a second nozzle 120a. Second nozzle 120a is similar to second nozzle 120 of FIG. 3 in all respects except with respect to shut-off valve 150a. Shut-off valve 150a of FIG. 4 includes a plug 154a and a cap 164. Plug 154a includes a passage 162a therethrough which is generally perpendicular to the longitudinal axis of plug 154a. Plug 154a further includes two crescent shaped cut-outs 172, 174 adjacent a front surface 176 of plug 154a. Plug 154a is disposed in bore 152a in front surface of 148a of second nozzle 120a. Cap 164 includes a threaded portion 166 and a head 168 which is larger than threaded portion 166. Cap 164 is disposed in a threaded bore 182 in front surface 148a of second nozzle 120a. Bore 182 is adjacent bore 154a. Head 168 of cap 164 overlaps plug 154a at cut-out 172 or 174 to retain plug 154a in nozzle 120a. When plug 154a is arranged such that head 168 of cap 164 overlaps cut-out 174, passage 162a is aligned substantially perpendicular to melt passage 132 such that plug 154a is in the closed position, as shown in right portion of FIG. 2. When plug 154a is arranged such that head 168 of cap 164 overlaps cut-out 172, passage 162a is substantially aligned with melt passage 132 such that plug 154a is in the open position, as shown in the left portion of FIG. 2. In order to adjust the position of plug 154a from open to closed or vice versa, a tool such as an Allen wrench is inserted into a shaped recess 180 in head 168 of cap 164. Cap 164 is rotated such that it is loosened from threaded bore 182, thereby freeing plug 154a. A tool such as an Allen wrench is then inserted into a shaped recess 178 in front surface 176 of plug 154a and plug 154a is rotated such that one of cut-out 172 or 174 is facing bore 182, depending on whether the desired position of plug 154a is open or closed. Only one shut-off valve 150a of FIG. 4 has been described, but as can be seen in FIG. 4, a plug 154a of a shut-off valve 150a intersects each melt passage 132 directed towards a respective gate seal 144.

Plugs 154, 154a and caps 156, 156a, and 156b, may be made of any suitable material such as beryllium copper, copper, copper alloys, or tool steel (H13).

Figure 5:
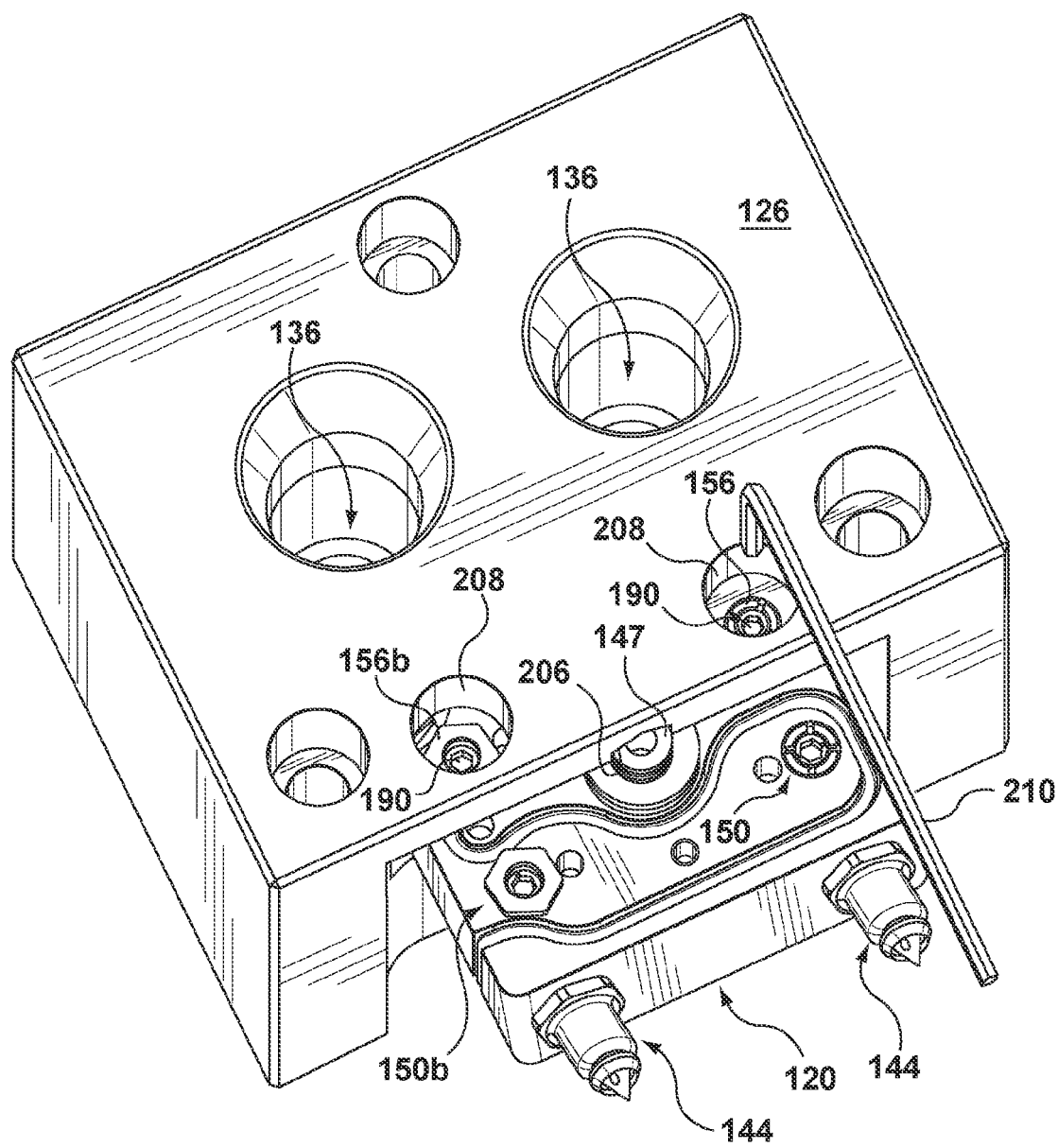
FIG. 5 is a bottom perspective view of the second nozzle 120 of FIG. 3 and a portion of the mold cavity plate.
Figure 6:
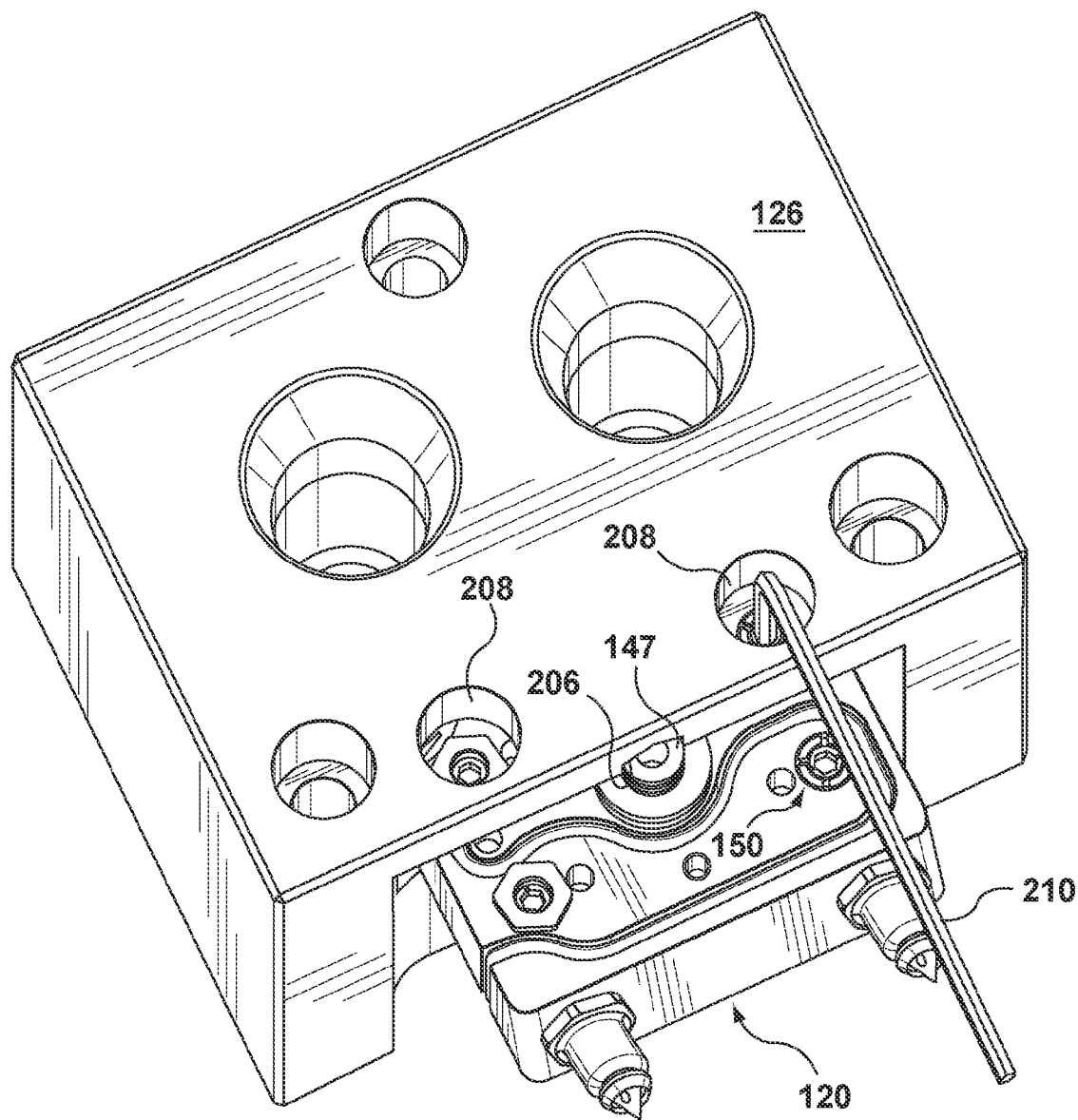
FIG. 6 is a bottom perspective view of the second nozzle of FIG. 3 and a portion of the mold cavity plate.

FIGS. 5 and 6 show second nozzle 120 with a partial cut-away of mold cavity plate 126 surrounding second nozzle 120. Mold cavity plate 126 includes a recess 206 for receiving projection 147 of second nozzle 120. Mold cavity plate 126 further includes bores 208 for access to shut-off valves 150. In order to switch a shut-off valve 150 from an open position to a closed position, tool 159 or a socket (not shown), depending on whether a cap 156 or 156b is used, is inserted through bore 208, engages cap 156 or 156b, and is turned to loosen cap 156 or 156b. A tool such as an Allen wrench 210 is then inserted through bore 208 and engages shaped recess 190 in plug 154, as shown in FIG. 6, to turn plug 154 to the desired position, as described above. If shut-off valve 150a shown in FIG. 4 is used, bores 208 may need to be larger in order to provide access to both cap 164 and plug 154a, as would be understood by one of ordinary skill in the art.

Figure 7:
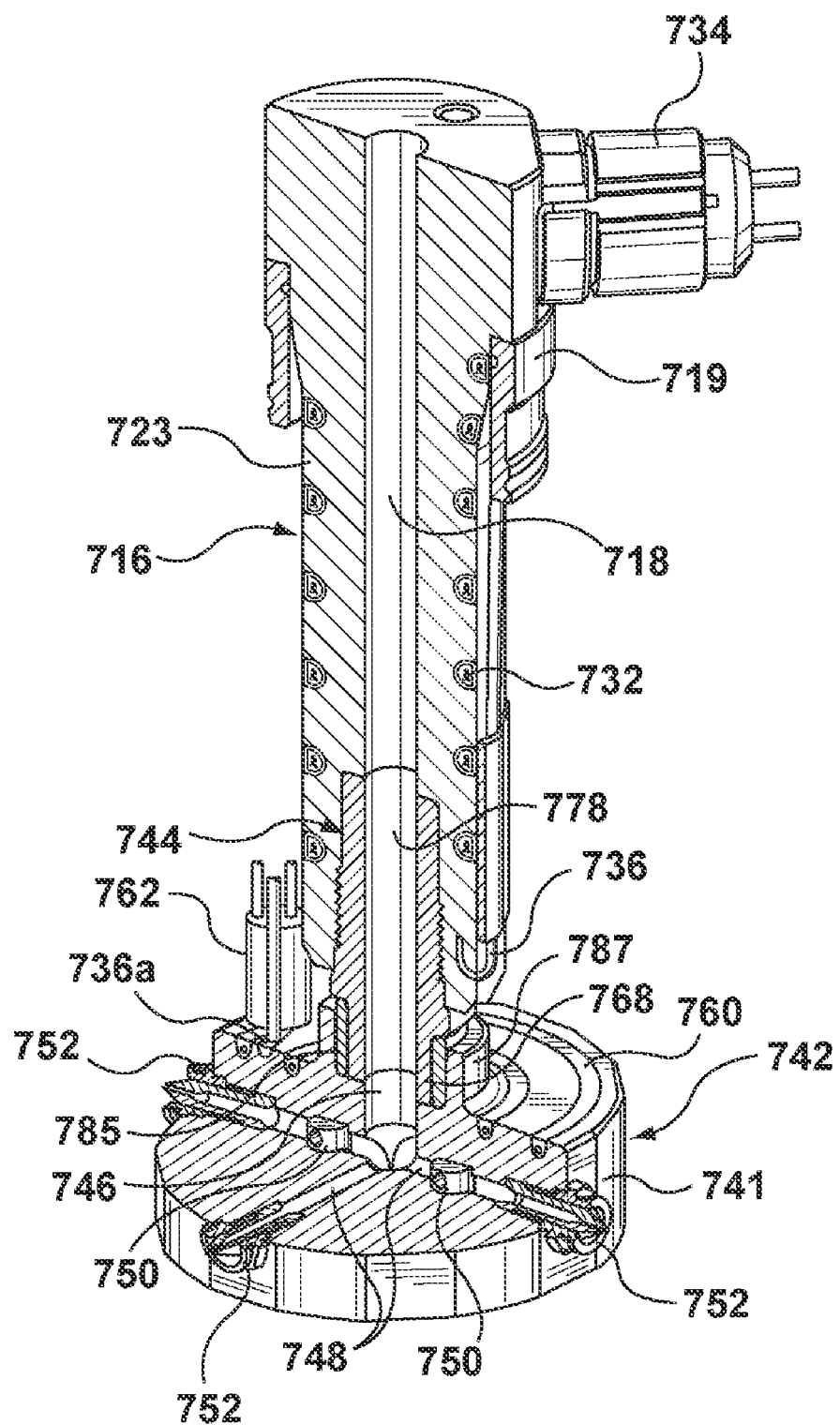
FIG. 7 is a partial cross-sectional view of a portion of an injection molding apparatus according to an embodiment of the present invention.
Figure 8:
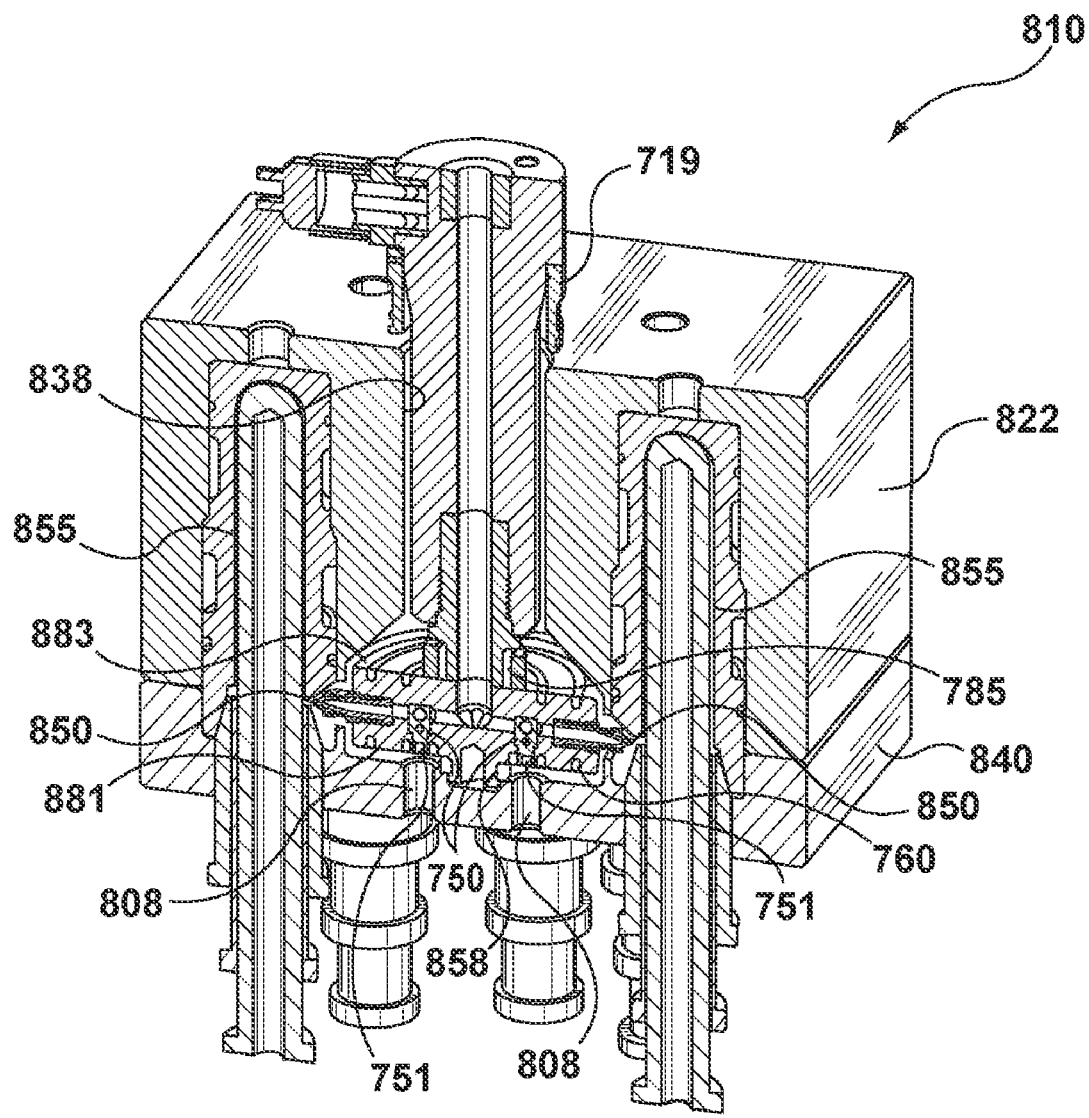
FIG. 8 is a partial cross-sectional view of the embodiment of FIG. 7 in a portion of an edge-gated system.

An edge-gated injection molding apparatus in accordance with another embodiment of the present invention is illustrated in FIGS. 7-8 and is generally indicated by reference numeral 810. Injection molding apparatus 810 includes a manifold (not shown) and is relatively fixed in position as described above with reference to the embodiment of FIGS. 1-3.

In this embodiment, a plurality of first, rear-mounted nozzles 716 are fluidly coupled to the manifold, each of which includes a first nozzle melt channel 718 fluidly coupled to a respective manifold channel (not shown). First nozzle 716 includes a body portion 723 that extends through an opening 838 of a mold plate 822. Each first nozzle 716 also includes a flange portion 719 that sits against mold plate 822. Flange portion 719 may be removable or an integral portion of first nozzle 716. When installed in an injection molding apparatus, the flange is held against the mold plate and acts to limit axial movement of the rear-mounted nozzle in the direction of a front-mounted nozzle 742 described below. During operation, the nozzle flange and mold plate arrangement acts in the same manner as described above with reference to the embodiment of FIGS. 1-3.

The embodiment of the present invention illustrated in FIGS. 7-8 includes second, front-mounted nozzle 742 fluidly coupled to first nozzle 716 by a nozzle link 744, which is described in greater detail below. Second nozzle 742 is an edge-gating nozzle that includes a second nozzle melt channel 746 for receiving melt from first nozzle melt channel 718. Radially extending melt passages 748 branch out from second nozzle melt channel 746 to deliver melt through gates 850 to a series of mold cavities 855. Mold cavities are radially spaced around an edge-gated tip portion of second nozzle 742. Second nozzle 742 has a substantially puck-shaped nozzle body 741 with a circular flange portion 787 extending from a back surface 883 and a projection 858 extending from a front surface 881. Projection 858 locates second nozzle 742 relative to a mold cavity plate 840 to align gates seals 752 with mold gates 850, and to reduce lateral and longitudinal movement of second nozzle 742.

Gate seals 752 threadably engage second nozzle 742 to deliver melt from melt passages 748 to mold cavities 855 via mold gates 850. Each gate seal 752 is longitudinally fixed in position relative to each respective mold gate 850 and mold cavity 855 as shown in FIG. 8. Gate seals 752 can be a two-piece seal, as shown and described above with respect to the embodiment of FIGS. 1 and 2. In the alternative, gate seal 752 can be a one-piece arrangement.

As illustrated in FIG. 7, each of first nozzle 716 and second nozzle 742 includes a heater 732, 760 and respective thermocouples 736, 736a for heating the melt therein. The nozzle heaters 732, 760 are in communication with a power source (not shown) through respective electrical connectors 734, 762. In the present embodiment as shown in FIG. 8, heater 760 wraps around a front surface 881 to back surface 883 of second nozzle 742 to beneficially surround gate seals 752 with heat.

In the embodiment of FIGS. 7 and 8, nozzle link 744 is coupled to first nozzle 716 and second nozzle 742 in a similar manner as described above with a seal 785 between a forward end 768 of nozzle link 744 and flange 787 of second nozzle 742. Seal 785 prevents melt leakage and absorbs the forces of thermal expansion of nozzle link 744. In one embodiment, seal 785 may be made of an insulative material to prevent heat loss at the slidable connection between the nozzle link and second nozzle. Although not shown, nozzle link 744 may seat within flange 787 of second nozzle 742 such that a gap is present between a forward end of the nozzle link and back surface 883 of second nozzle 742 during cold conditions.

Nozzle link 744 includes a melt passage 778 of a constant diameter, which allows melt to flow from first nozzle melt channel 718 to second nozzle melt channel 746 without an undesirable drop in pressure therebetween.

Second nozzle 742 includes shut-off valves 750 disposed within bores 751 in second nozzle 742. Shut-off valves 750 intersect with melt passages 748. Shut-off-valves 750 may be any of the shut-off valves described with respect to FIGS. 2-6 disposed in a puck-shaped second nozzle 742.

Figure 9A:
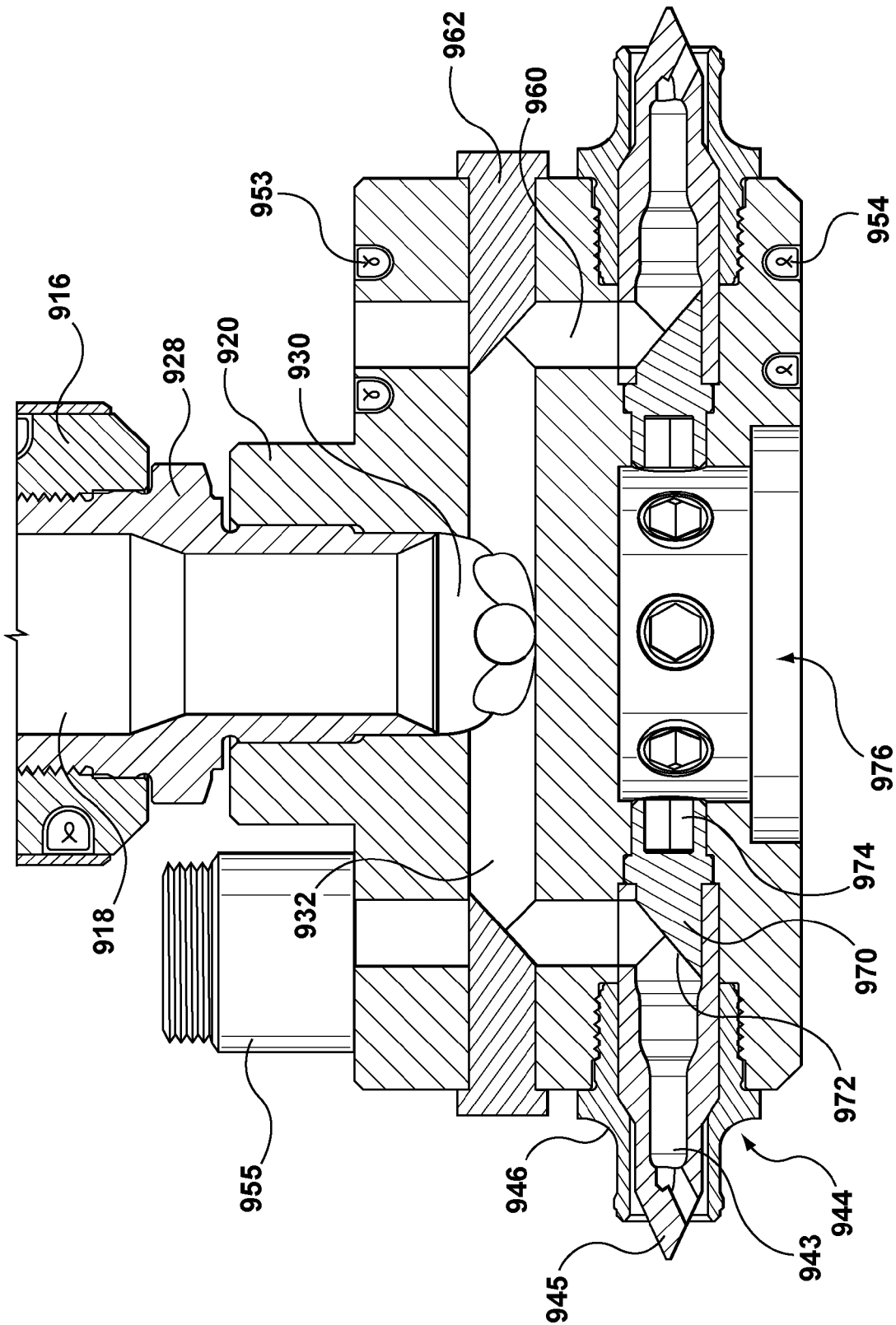
FIGS. 9A-B are partial cross-sectional views of individually rotatable shut-off plugs for a second nozzle according to another embodiment of the present invention.
Figure 9B:
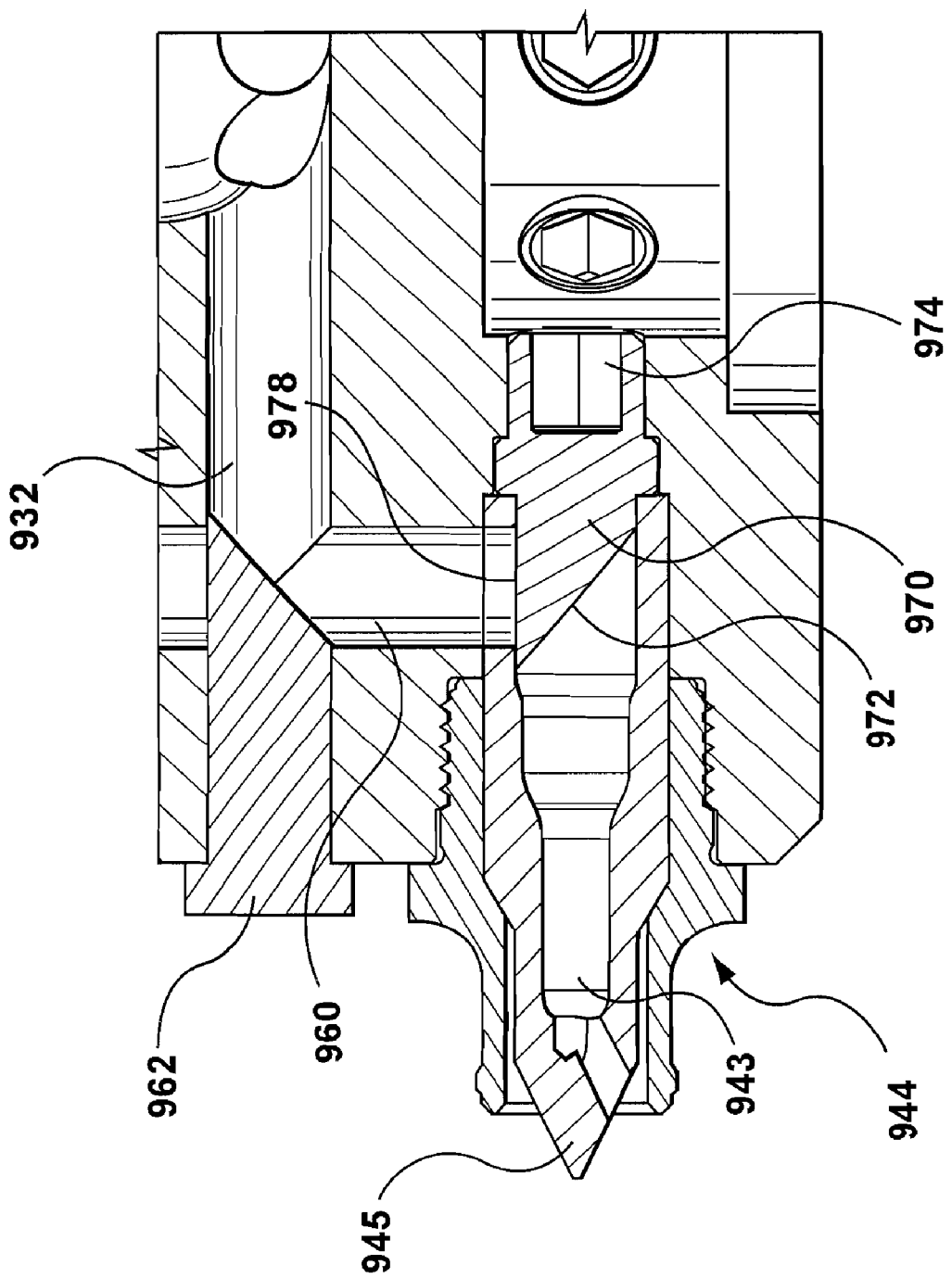

An edge-gated injection molding apparatus in accordance with another embodiment of the present invention is illustrated in FIGS. 9A and 9B. Features and aspects of the other embodiments can be used with this embodiment. The apparatus shown in FIGS. 9A and 9B can be incorporated into the larger injection molding apparatuses 100 and 810 as well as like apparatuses.

A second nozzle 920 is shown coupled to a first nozzle 916 by a nozzle link 928. Second nozzle 920 is an edge-gating nozzle that includes a second nozzle melt channel 930, which is aligned with a first nozzle melt channel 918 of first nozzle 916 for receiving melt therefrom. Radially extending melt passages 932 branch out from second nozzle melt channel 930 and are diverted to become downward extending passages 960 by plugs 962 having sloped surfaces (e.g., beveled, as shown, or contoured). The top side of the second nozzle 920 can include a heater 953 and a respective thermocouple (not shown) for heating the melt therein. The bottom side of the second nozzle 920 can include a heater 954, independently or cooperatively operational with the heater 953. A terminal end 955 for the heaters 953, 954 can be provided in the top side of second nozzle 920.

Gate seals 944 threadably engage second nozzle 920 and include melt passages 943 to deliver melt from melt passages 960 to mold cavities via mold gates (not shown; see FIG. 2, for example). Gate seals 944 are of a two part construction including a tip 945 that is surrounded by a seal 946 (tip retainer), as described elsewhere herein.

If a mold cavity, gate seal, or other portion of the injection molding apparatus related to a particular mold cavity becomes damaged or otherwise nonoperational, flow to that cavity can be shut off by a shut-off valve of the present invention. In this embodiment, each shut-off valve is a rotatable plug 970 disposed in a bore near the intersection of the downward extending melt passage 960 and gate seal melt passage 943. The plug 970 has a sloped melt-guiding surface 972 (e.g., beveled, as shown, or contoured) that directs flow of melt from the downward passage 960 to the gate seal passage 943. An opposite end of the plug 970 includes a shaped recess 974 for tool interface (e.g., an Allen wrench), which allows the plug 970 to be rotated via an access port 976 in the bottom of the second nozzle 920. Thus, each shut-off valve plug 970 is independently switchable between an open position and a closed position. The plugs 970 are held in their respective positions by melt pressure and/or thermal expansion. The positions of the shut-off valves can allow opening and closing them via the access port 976 to permit an operator to shut off flow to certain cavities without disrupting an entire system. FIG. 9A shows the plugs 970 in the open position.

FIG. 9B illustrates the shut-off-valve in the closed position. As can be seen, when the plug 970 is rotated 180 degrees from the orientation shown in FIG. 9A, a cylindrical blocking surface 978 of the plug 970 blocks melt from flowing from downward passage 960 to gate seal passage 943.

An edge-gated injection molding apparatus in accordance with another embodiment of the present invention is illustrated in FIGS. 10A and 10B. Features and aspects of the other embodiments can be used with this embodiment. The apparatus shown in FIGS. 10A and 10B can be incorporated into the larger injection molding apparatuses 100 and 810 as well as like apparatuses.

A second nozzle 1020 is connected to a nozzle link 1028 for connection to a first nozzle (not shown). Second nozzle 1020 is an edge-gating nozzle that includes a second nozzle melt channel 1030. Radially extending melt passages 1032 branch out from second nozzle melt channel 1030. The top side of the second nozzle 1020 can include a heater 1053 and a respective thermocouple (not shown) for heating the melt therein. The bottom side of the second nozzle 1020 can include a heater 1054, independently or cooperatively operational with the heater 1053. A terminal end 1055 for the heaters 1053, 1054 can be provided in the top side of second nozzle 1020. A locating ring 1056 is shown attached to the bottom of the second nozzle 1020 for locating and supporting the second nozzle 1020 in a larger apparatus (e.g., see FIG. 2).

Gate seals 1044 threadably engage second nozzle 1020 and include melt passages 1043 to deliver melt from melt passages 1032 to mold cavities via mold gates (not shown; see FIG. 2, for example). Gate seals 1044 are of a two part construction including a tip 1045 that is surrounded by a seal 1046 (tip retainer), as described elsewhere herein.

If a mold cavity, gate seal, or other portion of the injection molding apparatus related to a particular mold cavity becomes damaged or otherwise nonoperational, flow to that cavity can be shut off by a shut-off valve 1050 of the present invention. In this embodiment, each shut-off valve 1050 includes a rotatable plug 1070 disposed in a bore near the respective gate seal 1044. A shoulder of the plug 1070 abuts a lip of the bore, as indicated at 1076, to facilitate sealing against melt leakage. The plug 1070 has a passage 1072 that can allow flow of melt from melt passage 1032 to the gate seal melt passage 1043 when the plug passage 1072 is aligned thereto. One end of the plug 1070 includes a guide pin 1078 that engages a curved guide slot 1080 in the second nozzle 1020 to prevent overturning of the plug 1070. (The slot and pin locations can be reversed.) The guide slot 1080 can be a 90-degree circular arc. An opposite end of the plug 1070 includes a shaped recess 1074 for tool interface (e.g., an Allen wrench), which allows the plug 1070 to be rotated. A threaded cap 1082 is provided to abut the plug 1070 and thus lock the plug 1070 in the desired position. The cap 1082 has a shaped bore 1064 via which it can be loosened and tightened by a tool and through which the shaped recess 1074 of the plug 1070 can be accessed. Thus, each shut-off valve 1050 is independently switchable between an open position and a closed position. The positions of the shut-off valves 1050 can allow an operator to shut off flow to certain cavities without disrupting an entire system. FIG. 10A shows shut-off valve 1050 in the open position.

FIG. 10B illustrates shut-off valve 1050 in the closed position. As can be seen, when the plug 1070 is rotated 90 degrees from the orientation shown in FIG. 10A, the plug 1070 blocks melt from flowing from melt passage 1032 to the gate seal melt passage 1043.

FIG. 10C is a schematic of the guide pin 1078 and guide slot 1080 configuration, as viewed from the top or bottom (with detail omitted for clarity).

Figure 11A:
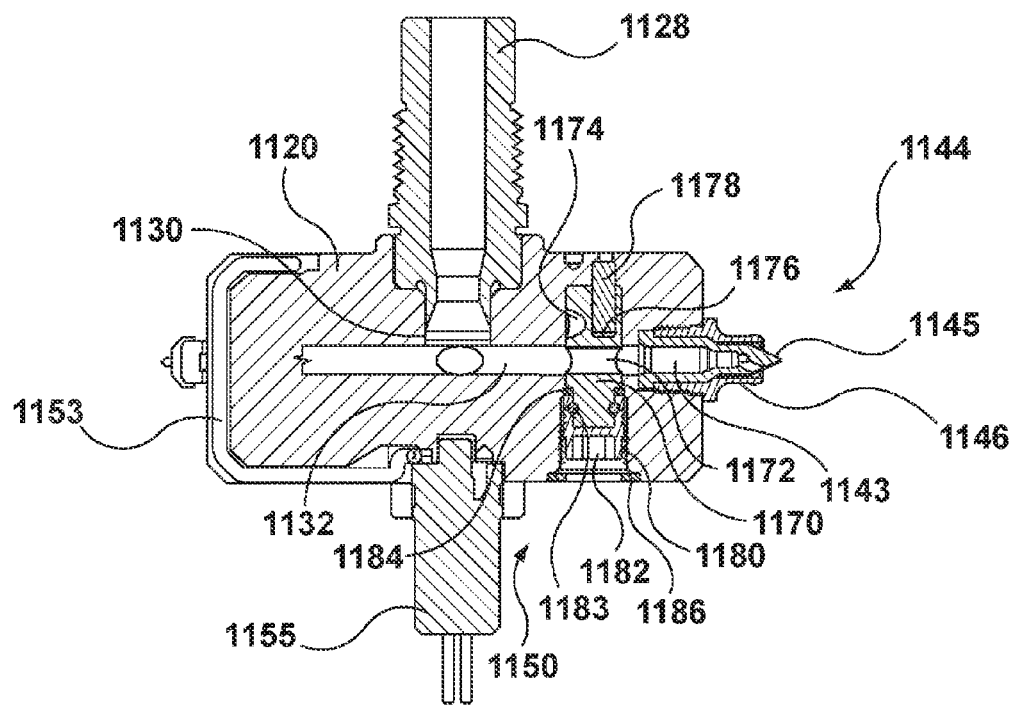
FIGS. 11A-B are partial cross-sectional views of individually translatable shut-off plugs for a second nozzle according to another embodiment of the present invention.
Figure 11B:
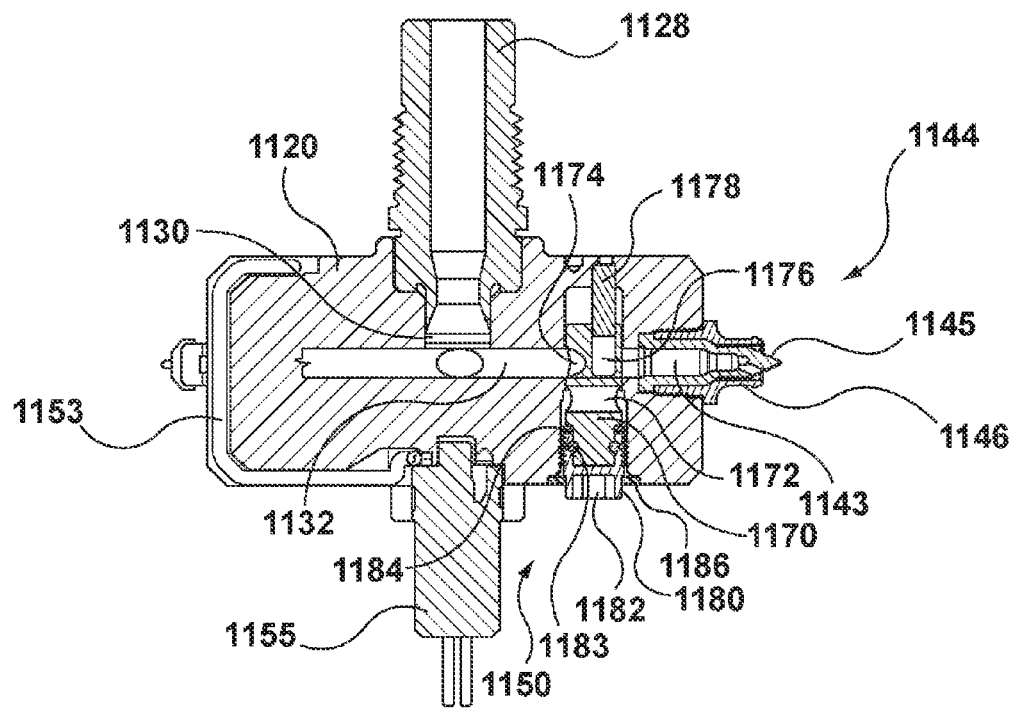

An edge-gated injection molding apparatus in accordance with another embodiment of the present invention is illustrated in FIGS. 11A and 11B. Features and aspects of the other embodiments can be used with this embodiment. The apparatus shown in FIGS. 11A and 11B can be incorporated into the larger injection molding apparatuses 100 and 810 as well as like apparatuses.

A second nozzle 1120 is connected to a nozzle link 1128 for connection to a first nozzle (not shown). Second nozzle 1120 is an edge-gating nozzle that includes a second nozzle melt channel 1130. Radially extending melt passages 1132 branch out from second nozzle melt channel 1130. A heater 1153 is wrapped around the top, bottom, and cylindrical side of the body of the second nozzle 1120 and a thermocouple (not shown) is provided. A terminal end 1155 for the heater 1153 can extend from the bottom side of the second nozzle 1120.

Gate seals 1144 threadably engage second nozzle 1120 and include melt passages 1143 to deliver melt from melt passages 1132 to mold cavities via mold gates (not shown; see FIG. 2, for example). Gate seals 1144 are of a two part construction including a tip 1145 that is surrounded by a seal 1146 (tip retainer), as described elsewhere herein.

If a mold cavity, gate seal, or other portion of the injection molding apparatus related to a particular mold cavity becomes damaged or otherwise nonoperational, flow to that cavity can be shut off by a shut-off valve 1150 of the present invention. In this embodiment, each shut-off valve 1150 includes a slidable and non-rotatable plug 1170 disposed in a bore of the second nozzle 1120 near the respective gate seal 1144. The plug 1170 has a passage 1172 that can allow flow of melt from melt passage 1132 to the gate seal melt passage 1143 when the passage 1172 is aligned thereto, and further includes a blind passage 1174 that prevents flow of melt from melt passage 1032 to the gate seal melt passage 1043 when the blind passage 1174 is aligned thereto. The blind passage 1174 assists in absorbing melt pressure and, naturally, can be used with any compatible embodiment described herein. One end of the plug 1170 includes a slot 1176 that mates with a pin 1178 connected to the second nozzle 1120 to align and support the plug 1170 (the slot and pin locations can be reversed.) The pin 1178 is located away from the longitudinal axis of the plug 1170 to prevent rotation of the plug 1170. Other anti-rotation schemes to hold the plug against rotation are also possible, such as using a plug and bore of mating non-circular cross-sections. An opposite end of the plug 1170 is connected to a set screw 1180 that is threaded into the second nozzle 1120 and that includes a shaped recess 1182 for tool interface (e.g., an Allen wrench), which allows the set screw 1180 to be rotated in its threaded bore. The plug 1170 is connected to the set screw 1180 so that the set screw 1180 is free to rotate and the plug 1170 is constrained to translate with the set screw 1180 as the set screw 1180 moves along its thread. A simple detent-type connection, as depicted at 1183, can achieve this. A seal 1184 is provided between the plug 1170 and the set screw 1180, and tightening the set screw 1180 forces the seal 1184 against an annular surface of the second nozzle 1120 to effect sealing when the plug 1170 is in the position shown in FIG. 11A. Another seal 1186 is provided in the second nozzle 1120 near the set screw 1180 to engage with a shoulder of the set screw 1180 when the set screw 1180 is backed off (as shown in FIG. 11B). Thus, each shut-off valve 1150 is independently switchable between an open position and a closed position, much like a gate or knife valve used in water services. The positions of the shut-off valves 1150 can allow an operator to shut off flow to certain cavities without disrupting an entire system. FIG. 11A shows shut-off valve 1150 in the open position.

FIG. 11B illustrates shut-off valve 1150 in the closed position. As can be seen, when the plug 1170 is translated from the position shown in FIG. 11A by turning the set screw 1180, the blind passage 1174 plug 1170 blocks melt from flowing from melt passage 1132 to gate seal melt passage 1143.

Figure 12:
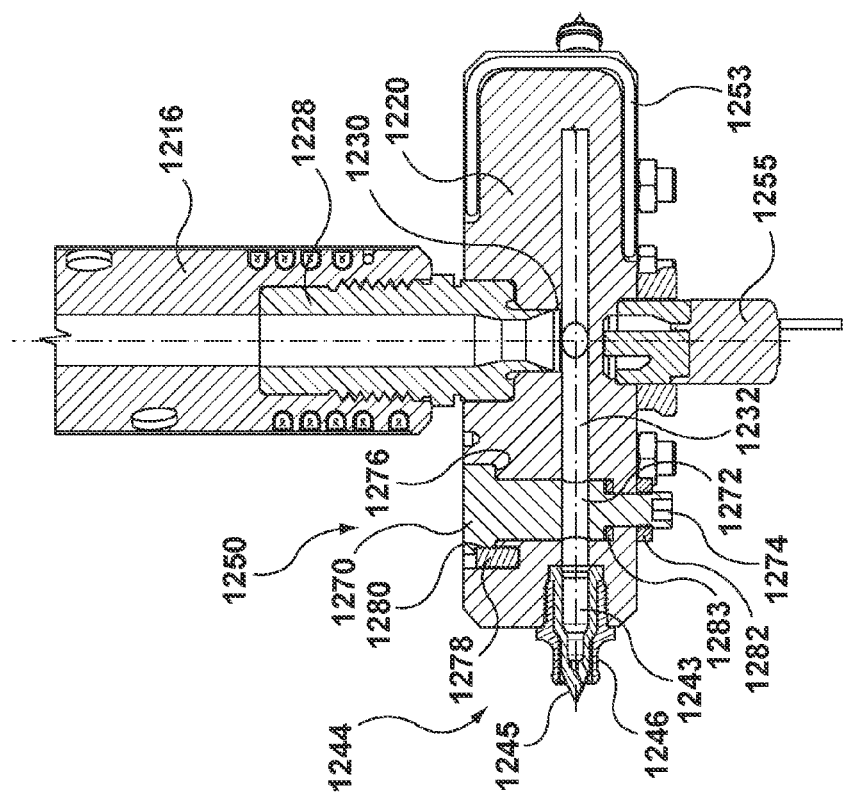
FIG. 12 is a partial cross-sectional view of an individually rotatable shut-off plug with a crush ring for a second nozzle according to another embodiment of the present invention.

An edge-gated injection molding apparatus in accordance with another embodiment of the present invention is illustrated in FIG. 12. Features and aspects of the other embodiments can be used with this embodiment. The apparatus shown in FIG. 12 can be incorporated into the larger injection molding apparatuses 100 and 810 as well as like apparatuses.

A second nozzle 1220 is connected to a first nozzle 1216 via a nozzle link 1228. Second nozzle 1220 is an edge-gating nozzle that includes a second nozzle melt channel 1230. Radially extending melt passages 1232 branch out from second nozzle melt channel 1230. A heater 1253 is wrapped around the top, bottom, and cylindrical side of the body of the second nozzle 1220 and a thermocouple (not shown) is provided. A terminal end 1255 for the heater 1253 can extend from the bottom side of the second nozzle 1220.

Gate seals 1244 threadably engage second nozzle 1220 and include melt passages 1243 to deliver melt from melt passages 1232 to mold cavities via mold gates (not shown; see FIG. 2, for example). Gate seals 1244 are of a two part construction including a tip 1245 that is surrounded by a seal 1246 (tip retainer), as described elsewhere herein.

If a mold cavity, gate seal, or other portion of the injection molding apparatus related to a particular mold cavity becomes damaged or otherwise nonoperational, flow to that cavity can be shut off by a shut-off valve 1250 of the present invention. In this embodiment, each shut-off valve 1250 includes a rotatable plug 1270 disposed in a through-bore near the respective gate seal 1244. A shoulder of the plug 1270 abuts a lip of the bore, as indicated at 1276, to facilitate sealing against melt leakage. The plug 1270 has a passage 1272 that can allow flow of melt from melt passage 1232 to the gate seal passage 1243 when the plug passage 1272 is aligned thereto. Near one end of the plug 1270 a guide pin 1278 is provided in the second nozzle 1220 to engage with a curved guide slot 1280 formed in the plug 1270 to prevent overturning of the plug 1270 (similar to that shown in FIG. 10C). (The slot and pin locations can be reversed.) The guide slot 1280 can be a 90-degree circular arc cut into the top flange of the plug 1270. An opposite end of the plug 1270 includes a shaped recess 1274 for tool interface (e.g., an Allen wrench), which allows the plug 1270 to be rotated. A lock nut 1282 is threaded onto a portion of the plug 1270 extending from the second nozzle 1220 to pull another shoulder of the plug 1270 into contact with a crush ring 1283 and thus lock the plug 1270 in the desired position and provide a positive seal against melt leakage. Thus, each shut-off valve 1250 is independently switchable between an open position and a closed position. The positions of the shut-off valves 1250 can allow an operator to shut off flow to certain cavities without disrupting an entire system. FIG. 12 shows the shut-off valve 1250 in the open position is shown. In the closed position, the plug passage 1272 extends into the page and thus does not connect the gate seal melt passage 1243 with the radial melt passage 1232 of the second nozzle 1220.

Figure 13:
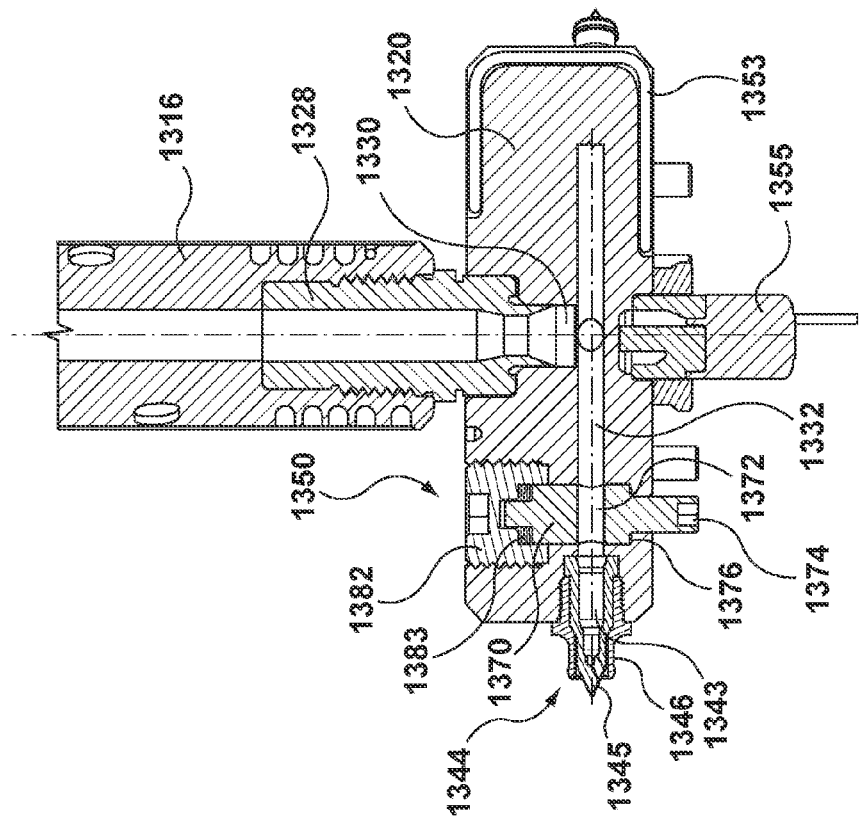
FIG. 13 is a partial cross-sectional view of an individually rotatable spring-loaded shut-off plug for a second nozzle according to another embodiment of the present invention.

An edge-gated injection molding apparatus in accordance with another embodiment of the present invention is illustrated in FIG. 13. Features and aspects of the other embodiments can be used with this embodiment. The apparatus shown in FIG. 13 can be incorporated into the larger injection molding apparatuses 100 and 810 as well as like apparatuses.

A second nozzle 1320 is connected to a first nozzle 1316 via a nozzle link 1328. Second nozzle 1320 is an edge-gating nozzle that includes a second nozzle melt channel 1330. Radially extending melt passages 1332 branch out from second nozzle melt channel 1330. A heater 1353 is wrapped around the top, bottom, and cylindrical side of the body of the second nozzle 1320 and a thermocouple (not shown) is provided. A terminal end 1355 for the heater 1353 can extend from the bottom side of the second nozzle 1320.

Gate seals 1344 threadably engage second nozzle 1320 and include melt passages 1343 to deliver melt from melt passages 1332 to mold cavities via mold gates (not shown; see FIG. 2, for example). Gate seals 1344 are of a two part construction including a tip 1345 that is surrounded by a seal 1346 (tip retainer), as described elsewhere herein.

If a mold cavity, gate seal, or other portion of the injection molding apparatus related to a particular mold cavity becomes damaged or otherwise nonoperational, flow to that cavity can be shut off by a shut-off valve 1350 of the present invention. In this embodiment, each shut-off valve 1350 includes a rotatable plug 1370 disposed in a through-bore near the respective gate seal 1344. A shoulder of the plug 1370 abuts a lip of the bore, as indicated at 1376, to facilitate sealing against melt leakage. The plug 1370 has a passage 1372 that can allow flow of melt from melt passage 1332 to the gate seal passage 1343 when the plug passage 1372 is aligned thereto. One end of the plug 1370 includes a shaped recess 1374 for tool interface (e.g., an Allen wrench), which allows the plug 1370 to be rotated. A threaded cap 1382 is provided at an opposite end of the plug 1370 to compress one or more disk springs 1383 against the plug 1370 and thus bias a shoulder of the plug 1370 to contact the lip (at 1376) in the bore of the second nozzle 1320 to hold the plug in the desired orientation and provide a positive seal against melt leakage. When the cap 1382 is tightened (e.g., by using an Allen wrench), the disk spring 1383 is compressed and pushes the plug 1370 against the lip (at 1376) where friction may prevent the plug from being rotated. When the cap 1382 is loosened, the disk spring 1383 relaxes and friction between the plug 1370 and the shoulder (at 1376) is reduced, thereby allowing the plug 1370 to be rotated. The disk spring 1383 or equivalent can be sized such that, even when the cap 1382 is loosened enough to be turned, sealing is maintained. Thus, each shut-off valve 1350 is independently switchable between an open position and a closed position. The positions of the shut-off valves 1350 can allow an operator to shut off flow to certain cavities without disrupting an entire system. FIG. 13 shows the shut-off valve 1350 in the open position. In the closed position, the plug passage 1372 extends into the page and thus does not connect the gate seal melt passage 1343 with the radial melt passage 1332 of the second nozzle 1320.

In each embodiment of the present invention described above, a convenient way to manually shut off an individual cavity in an injection molding apparatus is provided. Access to the shut-off valve is provided from the front of the apparatus, thus parts of the apparatus do not need to be removed to shut off an individual cavity. Further, even if the shut-off valve is damaged or needs to be replaced as part of regularly scheduled maintenance, it is easily accessed from the front of the apparatus without disturbing the remainder of the injection molding apparatus. Operation of any of the embodiments described above is summarized in the following procedure, in which one or more individual cavities are to be shut off.

First, an injection molding apparatus is provided having one or more of the shut off valves described above. In many cases, this includes a complete mold or hot-half for delivering melt to a plurality of cavities (e.g., 16, 32, 64, etc). Initially, the shut-off valves are set to their open positions so as to allow for operation of all cavities. Then, operation of the injection molding apparatus is commenced to deliver melt to the cavities and produce molded products. If the entire production run can be completed without a problem, then the shut-off valves need never be switched. However, if a problem with the molding operation occurs (cavity damage, malfunction, leakage, etc) or maintenance is to be performed, the operation of the injection molding apparatus can be temporarily interrupted so that an operator can switch the corresponding shut-off valve(s) to the closed position. Operation of the injection molding apparatus can subsequently be resumed with the problematic cavities taken out of service or with all cavities returned to service in the case of maintenance.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
a manifold having at least one manifold melt channel for receiving a melt stream of moldable material under pressure;

a nozzle having a heater, a nozzle melt channel in fluid communication with said manifold melt channel, and a plurality of outwardly extending melt passages in fluid communication with said nozzle melt channel;

a plurality of gate seals coupled to said nozzle, said plurality of gate seals for delivering the melt stream from said plurality of outwardly extending melt passages to a plurality of mold cavities through respective mold gates;

a plurality of shut-off valves, each shut-off valve disposed within said nozzle and associated with an outwardly extending melt passage, each shut-off valve independently switchable between an open position and a closed position, where at least one of the shut-off valves comprises a plug.

2. The injection molding apparatus of claim 1, wherein said plug is rotatable, includes a passage, and is disposed within a bore of said nozzle.

3. The injection molding apparatus of claim 2, wherein the passage is perpendicular to the longitudinal axis of the plug.

4. The injection molding apparatus of claim 1, wherein said at least one shut-off valve further comprises a cap, wherein said cap secures said plug.

5. The injection molding apparatus of claim 4, wherein said cap is threaded to the nozzle.

6. The injection molding apparatus of claim 1, wherein said at least one shut-off valve includes a position indicator.

7. The injection molding apparatus of claim 1, wherein said nozzle comprises:

a first nozzle having a first nozzle melt channel in fluid communication with said manifold melt channel;

a second nozzle having a second nozzle body, a second nozzle melt channel in fluid communication with said first nozzle melt channel to define the nozzle melt channel; and a nozzle link provided between the first nozzle and the second nozzle and having a nozzle link melt passage for fluidly coupling the first nozzle melt channel and the second nozzle melt channel.

8. The injection molding apparatus of claim 1, wherein each shut-off valve is disposed within a bore in said nozzle, wherein said bore intersects with one of said outwardly extending melt passages, wherein said shut-off valve includes a passage therethrough such that when said passage is aligned with said outwardly extending melt passage, the melt stream flows through said shut-off valve, and when said passage is aligned substantially perpendicular to said outwardly extending melt passage, the melt stream is prevented from flowing past said shut-off valve.

9. The injection molding apparatus of claim 1, wherein said at least one shut-off valve includes a lock nut to lock the plug in a position.

10. The injection molding apparatus of claim 1, wherein said plug includes one of a pin and a slot that engages the other of the pin and the slot provided to the nozzle to prevent overturning of the plug.

11. The injection molding apparatus of claim 2, wherein said plug is disposed in a through-bore of the nozzle.

12. The injection molding apparatus of claim 2, wherein said plug has a shoulder associated with a lip of the bore of the nozzle.

13. The injection molding apparatus of claim 12, wherein said shut-off valve further includes a crush ring disposed between the shoulder of the plug and the lip of the bore.

14. The injection molding apparatus of claim 12, wherein said shut-off valve comprises a threaded cap and a disk spring disposed between the plug and the threaded cap, wherein the disk spring biases the shoulder of the plug to contact the lip of the bore.

15. The injection molding apparatus of claim 1, wherein said plug is rotatable and includes a sloped melt-guiding surface and a blocking surface that blocks melt flow.

16. The injection molding apparatus of claim 15, wherein the nozzle has an access port for allowing a tool to interface with a shaped recess of the plug to rotate the plug.

17. The injection molding apparatus of claim 1, wherein said plug is slidable, includes a passage, and is disposed within a bore of said nozzle.

18. The injection molding apparatus of claim 17, wherein said at least one shut-off valve includes a set screw with which the plug is constrained to translate as the set screw moves along its thread.

19. The injection molding apparatus of claim 17, wherein the plug is held against rotation.

20. The injection molding apparatus of claim 1, wherein each shut-off valve comprises a blind passage that prevents flow of melt from the associated outwardly extending melt passage when the blind passage is aligned thereto.

21. An edge-gated injection molding nozzle for delivering molding material from a manifold to a plurality of mold cavities, comprising:

a nozzle body;

a heater connected to the nozzle body;

a nozzle melt channel defined in the nozzle body and in fluid communication with a manifold melt channel;

a plurality of outwardly extending melt passages defined in the nozzle body and in fluid communication with the nozzle melt channel;

a plurality of gate seals coupled to the nozzle body, the plurality of gate seals for delivering melt from the plurality of outwardly extending melt passages to a plurality of mold cavities through respective mold gates; and a plurality of shut-off valves, each shut-off valve disposed within the nozzle body and associated with an outwardly extending melt passage, the shut-off valves each independently switchable between an open position and a closed position.

22. A method of shutting off an individual cavity in an injection molding apparatus, comprising:

providing a plurality of shut-off valves, each shut-off valve disposed within an edge-gated nozzle of the injection molding apparatus and associated with an outwardly extending melt passage of a plurality of outwardly extending melt passages for delivering melt to a plurality of mold cavities through respective mold gates, the shut-off valves each independently switchable between an open position and a closed position, shut-off valves initially provided in the open position;

operating the injection molding apparatus to deliver melt to the plurality of mold cavities;

interrupting operation of the injection molding apparatus and then switching at least one of the shut-off valves to the closed position; and after shutting off the at least one of the shut-off valves, resuming operation of the injection molding apparatus.

* * * * *